United States Patent
Olson

(10) Patent No.: US 11,137,753 B2
(45) Date of Patent: Oct. 5, 2021

(54) SYSTEM FOR COMMUNICATIONS WITH UNMANNED AERIAL VEHICLES USING TWO FREQUENCY BANDS

(71) Applicant: Rhombus Systems Group, Inc., Philadelphia, PA (US)

(72) Inventor: Erlend Olson, Newport Beach, CA (US)

(73) Assignee: Rhombus Systems Group, Inc., Philadelphia, PA (US)

( * ) Notice: Subject to any disclaimer, the term of this patent is extended or adjusted under 35 U.S.C. 154(b) by 239 days.

(21) Appl. No.: 16/094,297

(22) PCT Filed: Jun. 14, 2017

(86) PCT No.: PCT/US2017/037522
§ 371 (c)(1),
(2) Date: Oct. 17, 2018

(87) PCT Pub. No.: WO2017/185106
PCT Pub. Date: Oct. 26, 2017

(65) Prior Publication Data
US 2019/0113912 A1    Apr. 18, 2019

Related U.S. Application Data

(60) Provisional application No. 62/323,957, filed on Apr. 18, 2016.

(51) Int. Cl.
*G05D 1/00* (2006.01)
*H04L 29/08* (2006.01)
(Continued)

(52) U.S. Cl.
CPC ......... *G05D 1/0022* (2013.01); *B64C 39/024* (2013.01); *G08C 17/02* (2013.01);
(Continued)

(58) Field of Classification Search
CPC ....................................................... G05D 1/00
See application file for complete search history.

(56) References Cited

U.S. PATENT DOCUMENTS

| 5,499,295 A | 3/1996 | Cooper |
|---|---|---|
| 6,058,478 A | 5/2000 | Davis |

(Continued)

FOREIGN PATENT DOCUMENTS

| CN | 1471778 A | 1/2004 |
|---|---|---|
| CN | 1582514 A | 2/2005 |

(Continued)

OTHER PUBLICATIONS https://transition.fcc.gov/oet/spectrum/table/fcctable.pdf 47 C.F.R. § 2.106; pp. 41-42; May 7, 2019 (Year: 2019).*

(Continued)

*Primary Examiner* — K. Wong
(74) *Attorney, Agent, or Firm* — Bonini IP Law, LLC; Frank J. Bonini, Jr.

(57) ABSTRACT

A system for RF communications with UAVs which includes two distinct frequency bands, one for optional use to support datagrams between a UAV payload and a computer or controller and a second RF communications band dedicated to command and control and navigation datagrams transception between the UAV and a host controller or control network. Embodiments of the system are implemented to cover, with regard to the second RF communications sub-system, a large region suitable for enabling communications with a number of UAVs by creating a skyward projected cell system, and dividing its frequency range into sub-channels, where sub-bands into which the frequency range may be divided may be used in a re-use scheme.

28 Claims, 8 Drawing Sheets

SYSTEM FOR COMMUNICATING WITH UAVs and RPVs

(51) Int. Cl.
*H04W 4/021* (2018.01)
*B64C 39/02* (2006.01)
*G08C 17/02* (2006.01)
*H04W 4/024* (2018.01)

(52) U.S. Cl.
CPC .......... *H04L 67/125* (2013.01); *H04W 4/021* (2013.01); *B64C 2201/146* (2013.01); *H04W 4/024* (2018.02)

(56) References Cited

U.S. PATENT DOCUMENTS

| | | | |
|---|---|---|---|
| 6,178,327 | B1 | 1/2001 | Gomez |
| 7,836,299 | B2 | 11/2010 | England et al. |
| 7,908,483 | B2 | 3/2011 | Iliev et al. |
| 8,375,221 | B1 | 2/2013 | Thom et al. |
| 8,787,904 | B1 | 7/2014 | Hayes et al. |
| 8,838,289 | B2 | 9/2014 | Margolin |
| 8,924,044 | B1 * | 12/2014 | Wang .................. G05D 1/0022 701/2 |
| 9,266,610 | B2 * | 2/2016 | Knapp ................... G06Q 10/10 |
| 9,540,121 | B2 * | 1/2017 | Byers .................... B64C 39/024 |
| 9,542,850 | B2 * | 1/2017 | Kantor ................. G08G 5/0039 |
| 9,547,985 | B2 * | 1/2017 | Tuukkanen ............. G08G 1/09 |
| 9,621,254 | B2 * | 4/2017 | Chang ................ H04B 7/18506 |
| 9,681,320 | B2 * | 6/2017 | Johnson ................ H04W 24/08 |
| 9,874,874 | B2 * | 1/2018 | Bernhardt .............. G08G 5/003 |
| 10,025,303 | B1 * | 7/2018 | Annan .................. G05D 1/0016 |
| 2002/0122471 | A1 | 9/2002 | Ling |
| 2005/0040914 | A1 | 2/2005 | Chambelin et al. |
| 2006/0229070 | A1 | 10/2006 | de La Chapelle et al. |
| 2008/0080549 | A1 | 4/2008 | Rofougaran |
| 2008/0102814 | A1 | 5/2008 | Chari et al. |
| 2009/0291690 | A1 | 11/2009 | Guvenc et al. |
| 2011/0212695 | A1 | 9/2011 | Wild et al. |
| 2013/0036103 | A1 | 2/2013 | Lawson et al. |
| 2014/0233412 | A1 | 8/2014 | Mishra et al. |
| 2014/0241239 | A1 | 8/2014 | Chang |
| 2014/0379173 | A1 | 12/2014 | Knapp et al. |
| 2015/0147976 | A1 | 5/2015 | Wang et al. |
| 2015/0236778 | A1 | 8/2015 | Jalali |
| 2016/0050011 | A1 | 2/2016 | Frolov et al. |
| 2016/0098259 | A1 | 4/2016 | Mitchell |
| 2016/0105233 | A1 | 4/2016 | Jalali |
| 2016/0244187 | A1 | 8/2016 | Byers et al. |

FOREIGN PATENT DOCUMENTS

| | | |
|---|---|---|
| CN | 101175279 A | 5/2008 |
| CN | 102269812 A | 12/2011 |
| CN | 104718509 A | 6/2015 |
| CN | 106027996 A | 10/2016 |
| JP | 2005535201 | 11/2005 |
| JP | 2011521593 | 7/2011 |
| JP | 2012502527 | 1/2012 |
| JP | 2016540453 | 12/2016 |
| WO | 2004014095 | 2/2004 |
| WO | 2010025997 | 3/2010 |
| WO | 2016170007 A1 | 10/2016 |

OTHER PUBLICATIONS

John D. Oetting and Tao Jen, "The Mobile User Objective System", Johns Hopkins APL Technical Digest, vol. 30, No. 2 (2011), pp. 103-112.

Trusted Platform Module (TPM) Summary, Trusted Computing Group, 2016.

Land wireless communication commission, Advisory Opinion No. 2036 "Technical Conditions on the Promotion of radio waves in robots" and No. 2034 Technical Conditions of a Communication System for Disaster Prevention, Information Communication Engineers, Information Communication technology Division Association, and an Association of Information Communication Engineers. Outline of the land.

* cited by examiner

PRIOR ART – TYPICAL UAV

PRIOR ART – TYPICAL RPV

PRIOR ART – TYPICAL UAV/RPV MILITARY COMMUNICATION NETWORK

PRIOR ART – TYPICAL RPV SATELLITE COMMUNICATIONS ANTENNA

SYSTEM FOR COMMUNICATING WITH UAVs and RPVs

SYSTEM FOR COMMUNICATIONS WITH UNMANNED AERIAL VEHICLES USING TWO FREQUENCY BANDS

BACKGROUND OF THE INVENTION

1. Field of the Invention

The invention relates to the field of wireless communications, and more particularly to systems, methods and components for operation of cellular communications networks in connection with unmanned and remotely piloted aerial vehicles.

2. Brief Description of the Related Art

Wireless systems for general public communications used today are often "cell" based, as illustrated in the diagram of FIG. 1. In such systems, mobile phones or mobile devices (100) within a larger geographic region (101) are served by a distribution of fixed location local radio transceivers which provide two way wireless communications to the devices in sub-regions of the larger region (102). When the mobile phone or mobile device moves from one location to a new location (103), it may be served by a different local fixed radio transceiver in the cellular wireless system (104), or by a different sector (104a, 104b, 104c) within the range of the same local fixed radio transceiver. Unmanned aerial vehicles (UAVs) and remote piloted vehicles (RPVs) can also move in and out of range of fixed radio transceivers.

The antenna radiation patterns of the fixed radio transceivers in the wireless system typically are oriented to be directionally along ground, as opposed to omni-directionally or skyward. Some reasons for such limited radiation patterns include firstly that users of wireless devices in such system are limited to being almost always physically along the surface of the earth, as wireless cell phone and smartphone communications whilst in a commercial airplane are generally forbidden by law, and secondly that cellular based communications systems avoid interference between cells which repeat use of frequencies, by limiting the radiated power that may enter adjacent or nearby cells, which is effectuated at least in part by controlling of the radiation pattern which emanates from the antenna associated with the fixed radio transceiver. A simplified diagram of the radiation pattern of a typical fixed radio transceiver in a cellular-based wireless communications system appears in FIG. 2. The horizontal or 'parallel to ground plane' pattern is indicated in (200) while the vertical pattern is indicated in (210).

Referring further to the pictorial diagram in FIG. 3, the vertical pattern can be further visualized. The fixed cellular radio transceiver antenna system (300) is typically mounted on a mast some distance above the ground (304) and designed to enable communications with mobile devices within some range radially from the antenna (303) by covering that area with a so-called beam (301) of specific frequencies which are used to transceive datagrams or voice traffic between a mobile device (not shown) and a cellular based communications system via the fixed antenna (300). The beam is typically designed to subtend a useful angle of 5 to 10 degrees (302) and may as well be tilted towards the ground by an additional 5 to 10 degrees (305). So-called vertical side-lobes which point towards the ground in fact assist in supplying coverage to mobile devices nearer to the antenna (306a) whilst vertical side lobes that point skyward (306b) are of typically of no use or consequence, and are ignored as byproducts of the antenna system.

Referring to FIG. 4, (400a) there is shown a simplification diagram of the fixed radio transceiver antenna indicated in FIG. 3, where each antenna (401, 402) is mounted up above the ground (410) and has a vertical radiation pattern substantially along ground (401a, 401b, 402a, 402b), and where the fixed radio transceivers are spaced according to some plan as might be in a typical cellular-type communications network in order to insure continuity of coverage. As is well understood by those practiced in the art, the actual spacing of the fixed radio transceivers is performed in 2 dimensions across the surface of a region to be covered, and a frequency re-use pattern is established such that the frequencies radiated from one fixed radio transceiver (401b) towards another (402a) are different, avoiding interference between adjacent locations. That is, the frequencies for communications associated with beam (401b) might be from frequency group $f_A$, whereas those associated with beam (402a) might be from frequency group $f_B$ and so on. Cellular-based communications system frequency re-use patterns are well studied and often involve directionality of the antenna (401, 402) in the horizontal direction as indicated in FIG. 1 (104a, 104b, 104c) and also indicated in FIG. 2 (201, 202, 203), in addition to simple frequency diversity as represented in FIG. 4 (401a, 401b, 402a, 402b).

The simplified situation depicted in FIG. 4 has been replicated in two dimensions across populated areas in the world today such that there are large regions and even whole countries where there is essentially continuous coverage zone or layer (421) near the ground where under most open-air conditions, reliable communications can be conducted between a mobile device and the cellular system and then subsequent end points connected to the cellular system (such as the public switched telephone network, other mobile devices or computer systems exchanging datagrams with the mobile devices on the cellular network). FIG. 5 is a so-called coverage map of the United States, where the blue regions are areas where there is continuous coverage of a cellular-type network capable of carrying either voice or datagram traffic to and from mobile devices located near the ground, and the white regions are areas where there is no coverage. As is evident by simple inspection, a majority of the United States is covered.

Presently, there is great interest in the deployment of unmanned aerial vehicles (hereafter, UAVs) and remotely piloted vehicles (hereafter, RPVs) for commercial activities. The interests include functions as varied as package delivery within a neighborhood from a local distribution warehouse to remote sensing of 1000's of miles of oil pipelines to check for leaks or right-of-way incursions.

For the purposes of discussion herein but without loss of generality and understanding that there may be substantial cross-over between categories, UAVs will be considered short range and low altitude aerial vehicles under 50 pounds in weight which fly under 2000 feet above ground level (AGL) and/or below legally controlled airspace, and may or may not have a remote operator actively guiding the UAV over part or all of a course of flight, where the remainder of the course of flight may be autonomously guided; RPVs will be considered long range and higher altitude longer range aerial vehicles above 50 pounds in weight, with typical normal-course flight altitudes above 2000 feet AGL and/or within legally controlled airspace, and typically have a human remotely piloting and/or monitoring the vehicle, with allowances for automation of normal course flight such as the use of an autopilot as is customary in manned aerial vehicles.

A typical UAV and a typical RPV are shown in FIGS. 6 and 7 respectively. UAVs and RPVs were developed originally for primarily military reasons, and as such the communications with them principally made use of military line-of-sight communications methods for UAVs, and military satellite networks for RPVs. An example of the communication network configuration for many present-day military RPVs is shown in FIG. 8, which shows that the UAV/RPV communicates firstly exclusively with dedicated satellites above it (801) in the indicated military application, which then relay communications to a command center (810). In fact, as shown in FIG. 9, the nose of the RPV shown in FIG. 7 is dedicated largely to a high gain tracking antenna which communicates with satellites orbiting above the RPV, at between 650 and 22,500 miles overhead. The path losses associated with communicating with a transceiver or transponder at such distances necessitate high gain antennas as indicated in FIG. 9 (901).

In order for RPVs, and to some extent UAVs, to be useful for commercial activities, in most jurisdictions they must comply with laws and regulations governing the use of controlled airspace. Generally such compliance requires that the UAV/RPV be able to communicate with air traffic controllers and also see or sense and then avoid other air traffic. Thus in addition to any real-time datagrams that are required by the commercial activity to be sent between the UAV/RPV and its operations center, the RPV must maintain constant communications with its operations center to transmit images from the RPV and communications between the RPV and air traffic control centers, so that the RPV can act and be directed as though it were itself a manned aerial vehicle.

The need for constant communications puts significant demands on the communications link to the orbiting satellites. Besides the difficulties with communications over such distances (650 to 22,500 miles), there are limited satellites available, each with limited bandwidth, and they are insufficient in number and available operating bandwidth to accommodate significant commercial activities via RPVs and UAVs. In addition, smaller RPVs and UAVs do not have the room or payload capability for the antenna systems necessary for the RPV or UAV to communicate to satellites. In addition, there is little or no redundancy of the satellites and if a satellite transponder fails and/or the communications via that satellite is compromised, then all communications with the RPV/UAV may be lost, and subsequently control for the RPV/UAV may be lost.

Difficulties often exist in communicating with UAVs when the UAV is in controlled airspace or is beyond the line-of-sight from a controller or operator, via an RF link. In the US, controlled airspace is the space above 400 feet. A problem exists to communicate continuously with unmanned aerial vehicles when they are in controlled airspace (i.e., above 400 feet in the US) and/or beyond line-of-sight from a controller or operator, via an RF link. While a system for projecting a ground-based RF cellular-type system into the air is needed for facilitating communications with UAVs, a further need exists for this system to provide sufficient reliability for critical command and control of UAVs, whilst simultaneously providing high bandwidth support for remote sensing applications.

SUMMARY OF THE INVENTION

A system for communications with unmanned aerial vehicles (UAVs) is provided. The system provides high reliability for critical operations, such as, for example, command and control and navigation functions of a UAV, while also providing high bandwidth support for handling remote sensing applications, such as, for example, payload operations, imaging, camera, sound, and delivery activities. The system preferably is configured to include a plurality of frequency bands, and, according to a preferred embodiment, provides a first frequency band for a first type of communications and a second frequency band for a second type of communications. The communications preferably are RF communications between the UAV and another component, which preferably take place through a network supporting the RF communication. According to a preferred implementation, the other component is a command and control device, such as a computer, that provides datagrams to the UAV to control operations or functions. The command and control device also may receive communications from the UAV. Embodiments of the system provide RF communications with UAVs which includes two distinct frequency bands, one for optional use to support datagrams between a UAV payload (e.g., remote sensing operations) and a computer or controller and a second RF communications band dedicated to command and control and navigation datagrams transception between the UAV and a host controller or control network.

According to a preferred implementation, the system is configured for transmitting and exchanging RF communications with UAVs. In an implementation of the system, the system is configured with two distinct frequency bands, which preferably are RF communication bands. One of the communications bands is utilized for optional use to support datagrams, such as, for example, between a UAV payload and a computer or controller, while a second RF communications band is provided and is dedicated to command and control and navigation datagrams transception between the UAV and a host controller or control network. Embodiments preferably may be implemented to provide command and control and navigation datagrams between a UAV and a command and control computer which take place within a designated RF frequency band, which preferably is separate and dedicated to the command, control and navigation operations.

The system may be configured to use spatial frequency re-use schemes, like that of terrestrial cell systems, but projected up into the sky, as opposed to projected along ground. In addition, preferred embodiments may be configured to implement polarization, such as, for example, left or right circular polarization for particular sub-band regions (e.g., sub-band regions of the dedicated or second RF communications band) that are designated to handle the command and control and navigation datagrams between the UAV (or RPV) and a command and control computer. Reliability may be further enhanced by implementing features, such as, for example, forward error correction in the construction of datagrams, which may include convolutional error correction codes, and/or the use of turbo codes in the construction of datagrams. In addition, some embodiments of the system may be carried out utilizing separate redundant back-haul between a wireless equipment datagram transceiver point and a central computer handling the air traffic control datagrams for a region, in order to enhance reliability. For example, separate redundant back-haul operations may be implemented between or among the communicating components of a network, such as, for example, fixed location transceivers, base transceivers, base stations, nodes or their equivalents (depending on the network protocol).

The sub-band groups of radiation bands through which command and control transmissions are handled may be arranged in a re-use configuration, and the angle of the radiation cone projected by the antenna may be adjusted, e.g., electronically or mechanically.

The system may be implemented in conjunction with existing cell towers, or, alternately, may be implemented using separately provided towers that are dedicated to the UAV/RPV command and control communications.

The system, method and components may be implemented for managing and operating reliable communications with a wide variety of RPVs and UAVs. Embodiments of the system are configured to provide redundant coverage especially over populated areas where the operation of, and communications with, the RPV/UAV are especially important for safety reasons. The present invention is an improvement to the currently limited modern cellular data and voice network which is currently limited to near-ground operations.

According to some preferred embodiments, a cellular type communications system is provided. The system is configured to provide a first near-ground region to communicate with devices near the ground. Additional layers, such as, for example, one or more second layers are provided covering roughly the same areal extent as the first near-ground region but which are separated from each other, and which also are elevated above ground substantially. The system is configured to provide the second or additional elevated region or layer to serve as a region within which an aerial vehicle may rely on communications using the cell-based communications network. The cellular based network therefore handles near-ground communications through the first near-ground region, and skyward communications through the second or elevated region or regions. The levels preferably are separated from one another, which may be physically through the use of barriers, such as, for example, passive reflectors. Additionally, or alternatively, the communications transceivers, that is those of near-ground devices, and those of aerial vehicles, such as RPVs and UAVs, may be configured to operate using different protocols, so that in the event communications within the second region are attempted using a near-ground device, they will not affect the operation of the second level aerial region communications. For example, a skyward communications protocol may be differentiated from the along-ground communications protocol in order to uniquely identify UAV and RPV transceivers from along-ground cell phones and smartphones and the like.

In order to carry out preferred embodiments of the invention, the present system may be configured by deploying an antenna system mounted on an existing cellular network base station fixed transceiver antenna mount. The antenna system preferably is a skyward antenna system and is configured to radiate radio frequency energy skyward. According to preferred embodiments, the radiation frequency is propagated over some subtended angle in a cone or other shape. According to some embodiments, the antenna system may be connected to a second set of transceiver equipment similar or identical to existing cellular network equipment and effectuates communications with vehicles in the air (e.g., UAVs and RPVs) instead of along the ground.

According to preferred embodiments, the skyward signal propagated by the skyward pointing antennas are polarized, and preferably, horizontally or circularly polarized. According to some preferred embodiments, two sets of signals are radiated skyward of differing sets of frequencies, where the angles subtended by the radiation pattern differ in order to effectuate continuous communications coverage for differing elevation bands above the antenna. For example, a first angle of a radiation pattern may extend skyward and represent a region of frequencies for which a first type of skyward vehicle is configured to communicate using. This may be for UAVs, which typically are operated at lower levels compared with some RPVs. In this example, a second frequency region may be provided through a second radiation pattern having a different subtended angle, which may provide a region for RPV communications. The differing elevation bands may represent second layers of the skyward region.

According to some embodiments, the skyward signal propagated by the skyward pointing antennas may be polarized in accordance with preferred polarization. For example, the upper radiation propagation from a skyward antenna may be configured to direct radiation in a pattern, such as, for example, in a shape, like a cone. Signal isolation may be implemented in connection with the embodiments of the system and communicating devices to enhance the quality of the communications, and thereby eliminate or reduce the potential for unintentional interaction between signals of differing frequencies, or bands of frequencies. Embodiments may provide isolation of the signals using diverse frequencies (e.g., certain frequencies for UAVs versus other frequencies for RPVs). In addition to frequency diversity, signals also may be isolated by polarization patterns. According to a preferred embodiment, polarization may include right-hand circular polarization and left-hand circular polarization. For example, one skyward cone (e.g., a lower layer) may have right-hand circular polarization of the propagated signals, while another skyward cone (e.g., a higher level layer) may have left-hand circular polarization of the propagated signals. According to some embodiments, the system, method and devices may further provide polarization patterns for UAV and RPV transmitting and receiving, as well as the base station. For example, corresponding polarization patterns may be implemented for transmission and reception between communicating components, such as transceivers.

The skyward radiation energy preferably may be emitted as a pattern, and the skyward pointing radiation pattern, according to some preferred embodiments, is electronically created and controlled. According to some preferred embodiments, the skyward pointing radiation pattern may be electronically steered to follow a specific UAV or RPV.

The energy radiated for a given skyward pattern may be limited to assist in providing separation between bands of aerial vehicle continuous communications regions.

According to some additional embodiments, further methods and configurations may be implemented to differentiate the UAV and RPV type vehicles (and their communications) from ground-based cellular devices. UAV and RPV transceivers may be configured to have unique or differentiated identification numbers or classes of IMEIs (international mobile equipment identity numbers) enabling rapid differentiation by the cellular communications network between RPV and UAV communications and along-ground communications. The system may be configured to take any action thereupon, such as special routing of the datagrams or voice traffic.

The systems may incorporate and include processing components, such as, for example, processors, microprocessors, and circuits and software with instructions for processing communications from communicating equipment and transceivers carried or associated therewith. The software may be stored on a suitable storage component, such as flash memory, hard disk storage, or other suitable media, and include instructions for carrying out the steps for implementing the communications over the first or near-ground zone level and second levels where aerial communications with aerial vehicles take place.

Features described herein in connection with one embodiment may be implemented in conjunction with other embodiments, and features may be combined together so that embodiments may be provided with one, two or combinations of several features.

These and other advantages of the invention are described herein and illustrated in connection with the illustrated embodiments.

BRIEF DESCRIPTION OF THE DRAWING FIGURES

DETAILED DESCRIPTION OF THE INVENTION

Referring to FIGS. 1 to 12, there is illustrated communication systems, including a system for providing skyward communications which is designed to exchange communications between unmanned aerial vehicles (UAVs) (or RPVs), and a command and control computer which may be remotely situated from the UAV (or RPV).

Some embodiments of the invention may use some parts of an existing installed base of cellular networks presently serving most of the world's population along the ground, as the backbone of a system for servicing the communications and datagram exchange needs of emerging commercial UAV and RPV activities in the air. Other embodiments may provide separate communications components.

Figure 1:
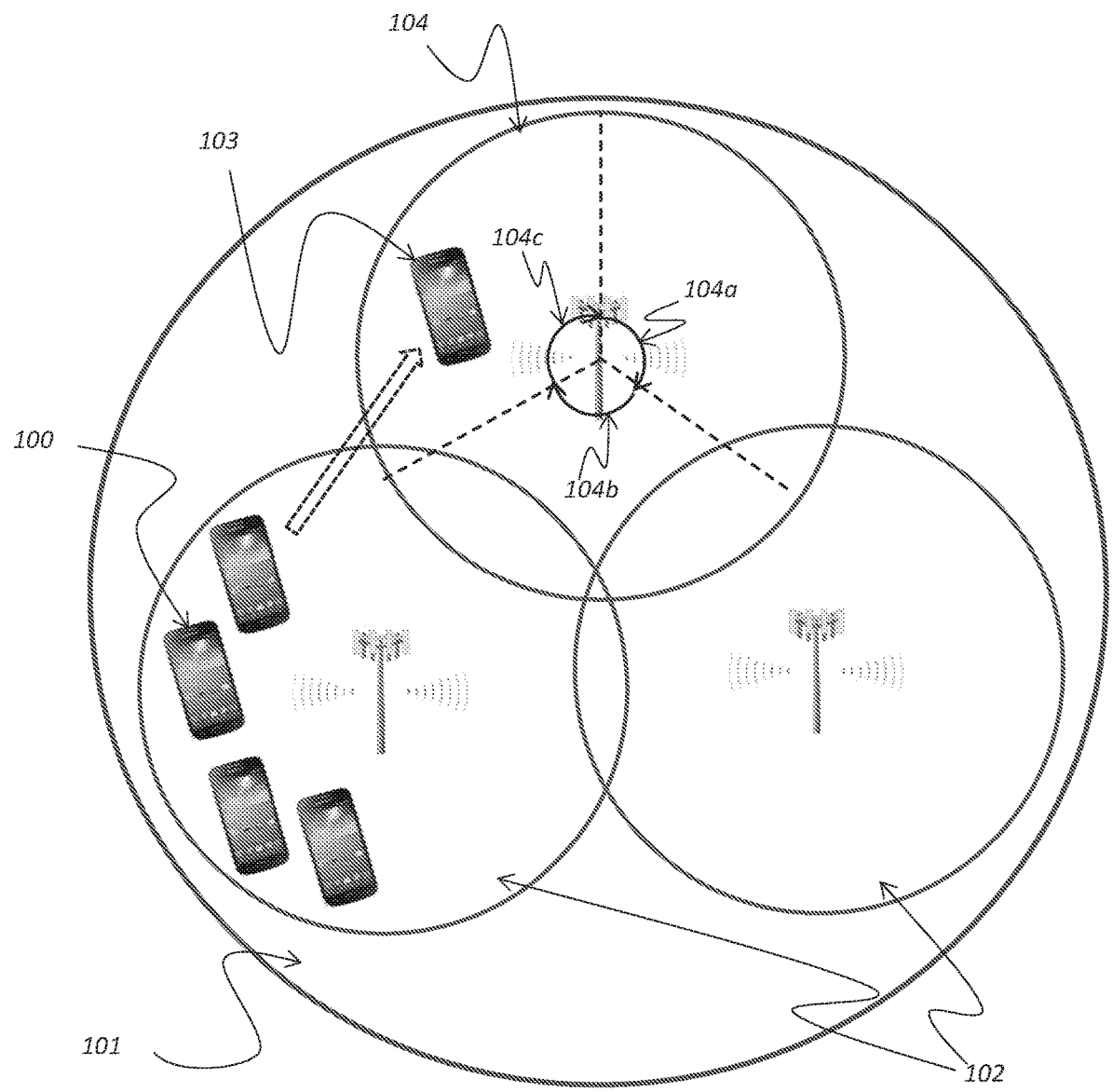
FIG. 1 is a schematic illustration representing a "cell" based wireless system for general public communications used today.
Figure 2:
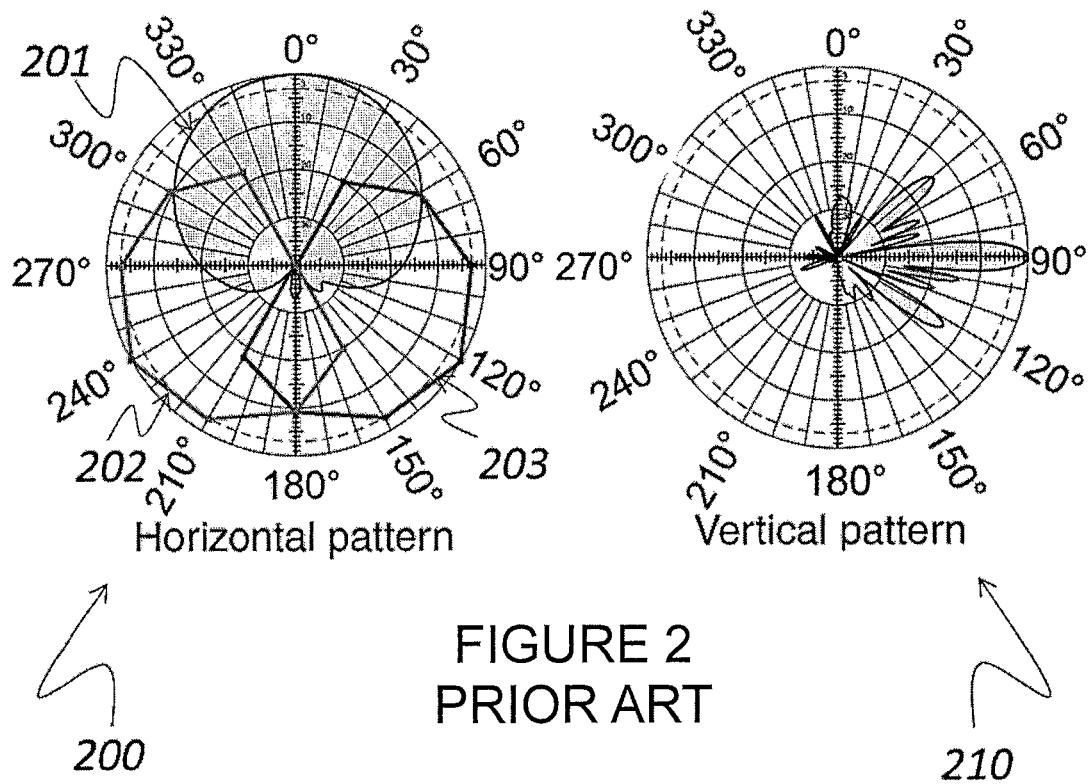
FIG. 2 is a diagram of a radiation pattern of a typical fixed radio transceiver in a cellular-based wireless communications system.
Figure 3:
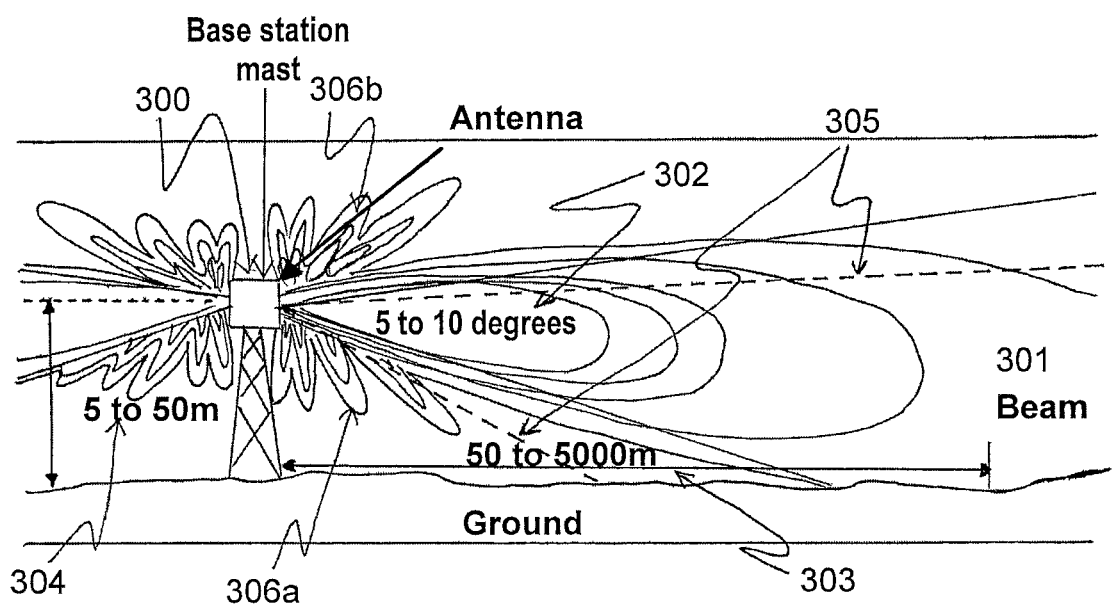
FIG. 3 is a pictorial diagram illustrating a base station and antenna in a fixed transceiver antenna system showing a visualized representation of a vertical radiation pattern.
Figure 4:
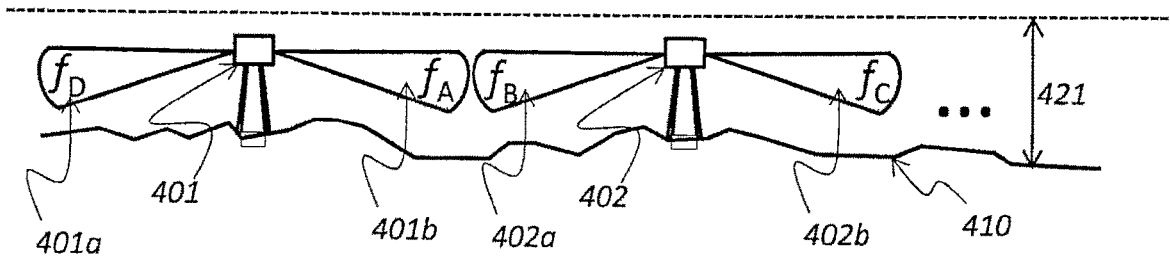
FIG. 4 is a diagram showing a plurality of the fixed radio transceiver antenna of FIG. 3, shown spaced apart from each other and illustrating respective radiation patterns.
Figure 5:
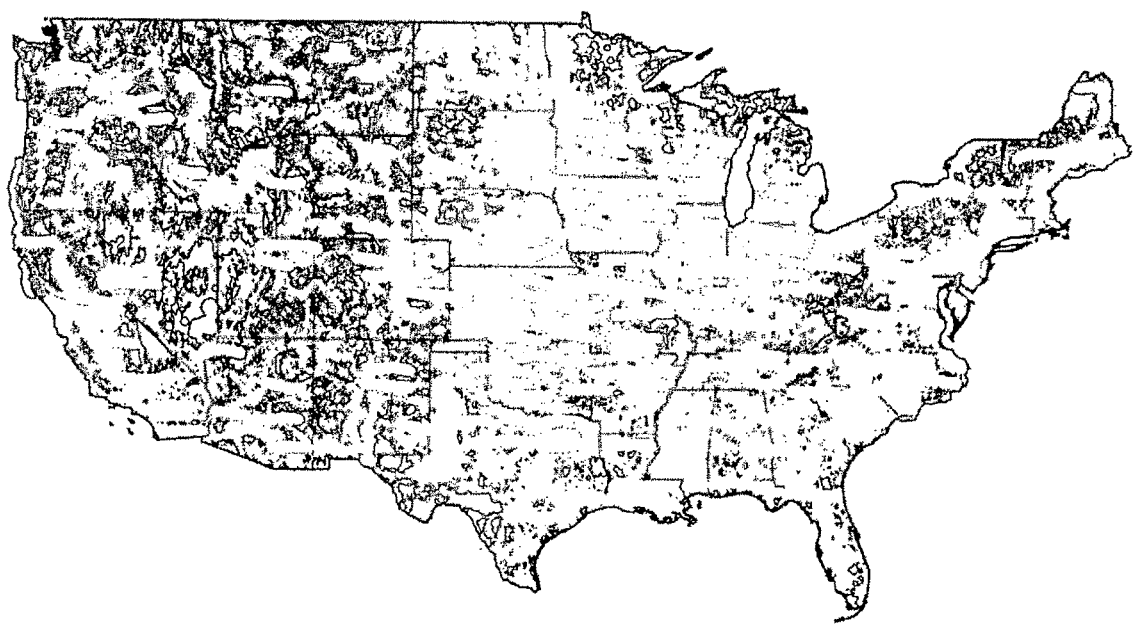
FIG. 5 is a depiction of a coverage map of the United States, illustrating regions of coverage for a cellular-type network capable of carrying either voice or datagram traffic to and from mobile devices located near the ground.
Figure 6:
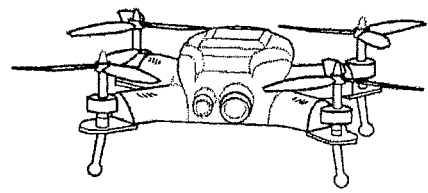
FIG. 6 is an illustration depicting an example of an unmanned aerial vehicle (UAV).
Figure 7:
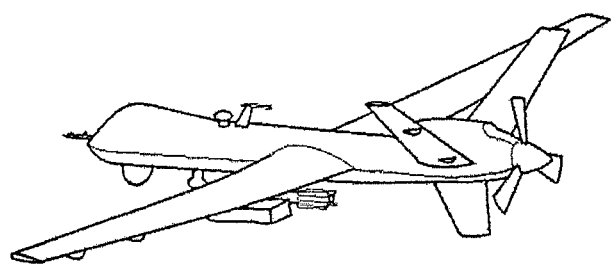
FIG. 7 is an illustration depicting an example of a remote piloted vehicle (RPV).
Figure 8:
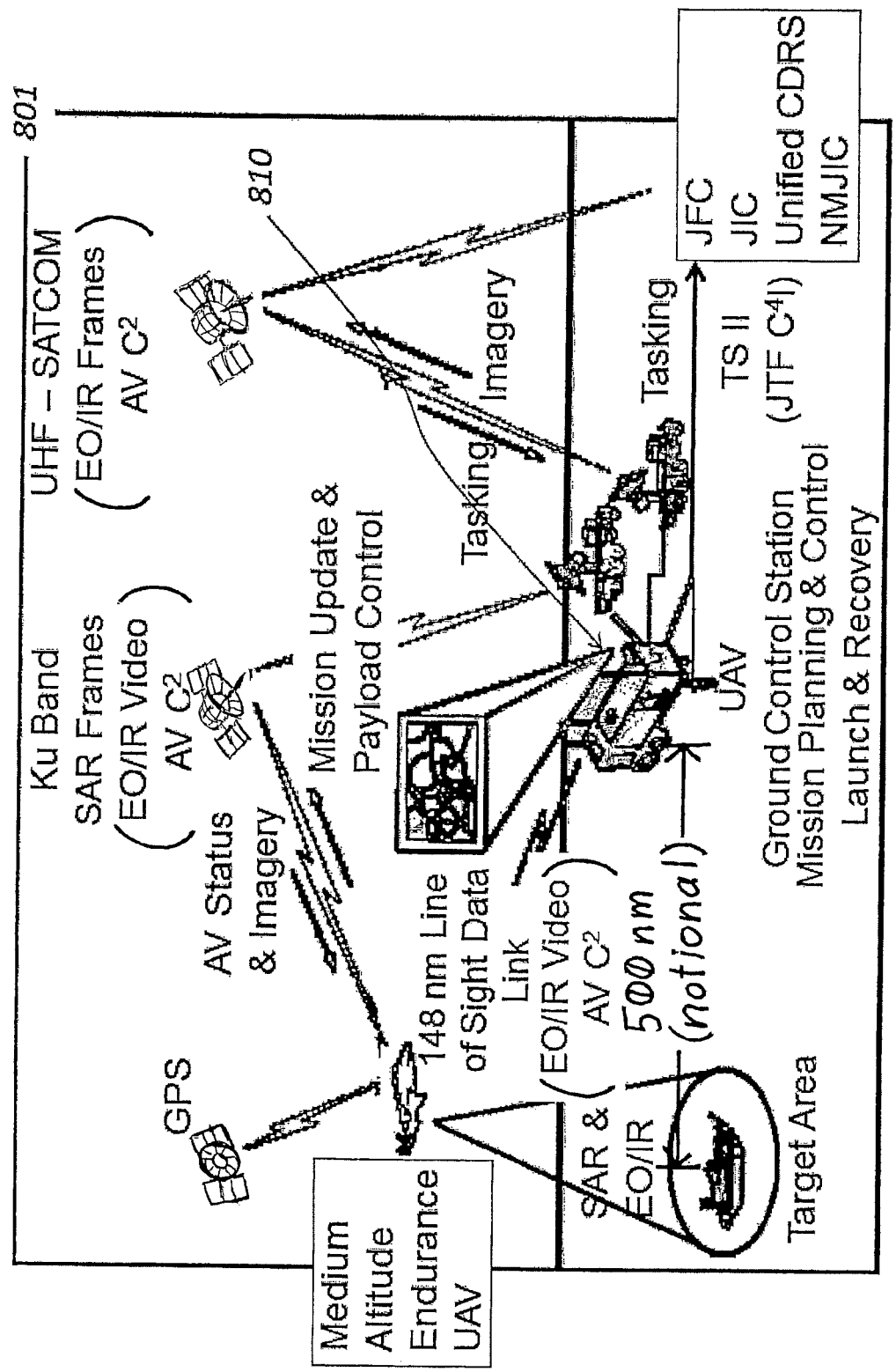
FIG. 8 is a schematic diagram illustrating a typical UAV/RPV military communication network.
Figure 9:
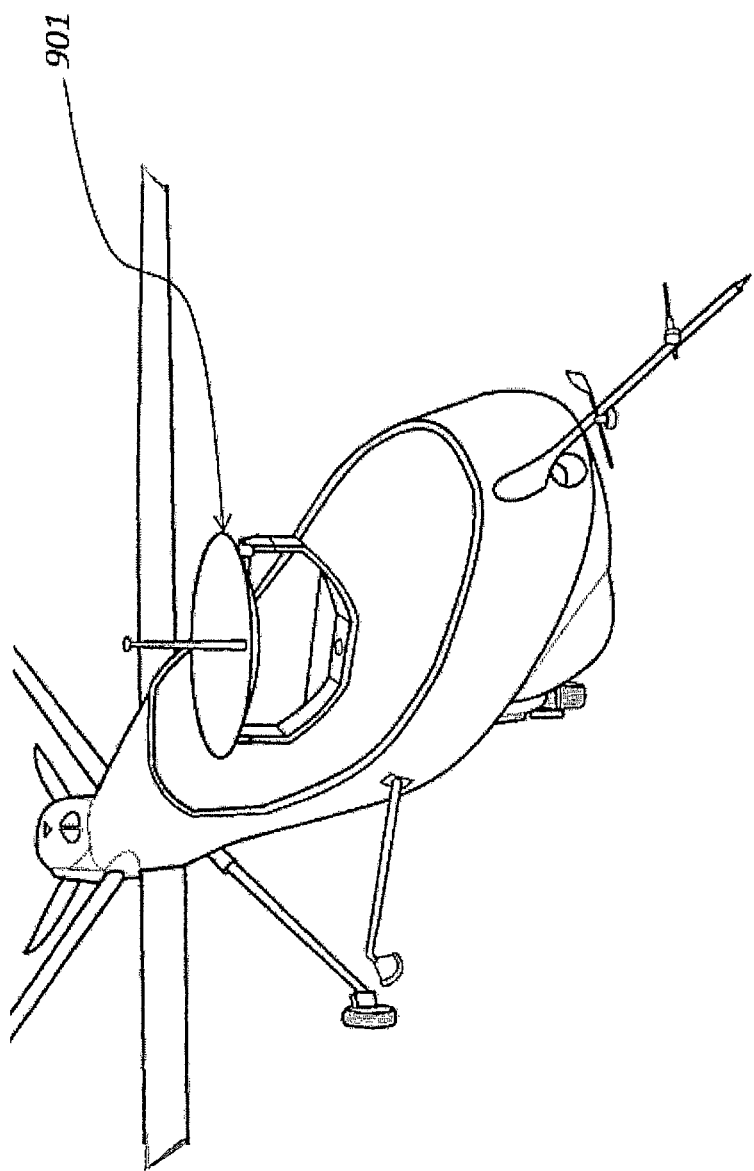
FIG. 9 is an illustration depicting an example of a remote piloted vehicle (RPV) satellite communications antenna.
Figure 10:
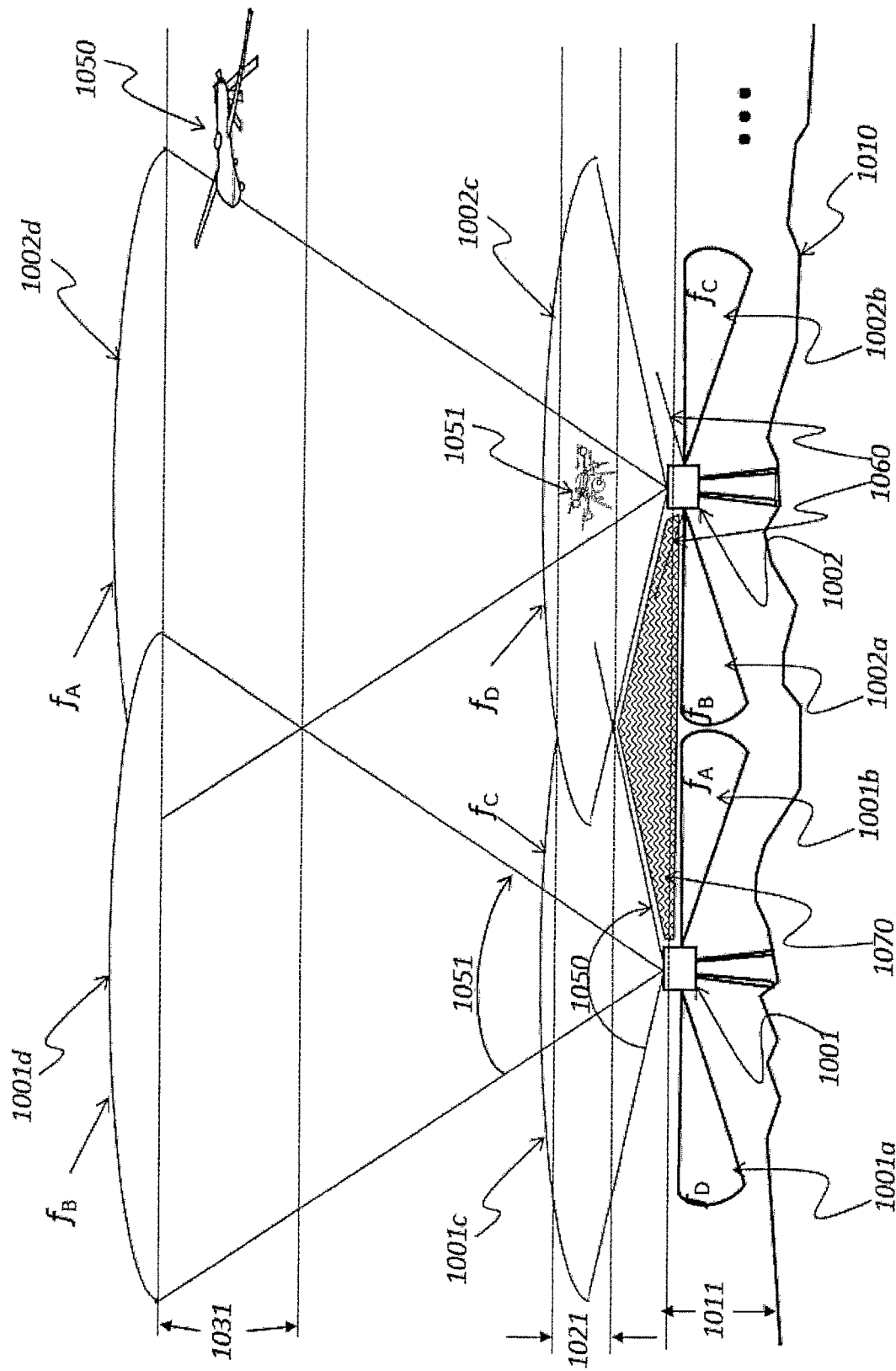
FIG. 10 is an illustration of a preferred embodiment depicting a system for communicating with UAVs and RPVs.

Referring to FIG. 10, new antennas are mounted on one or more existing cellular network towers (1001e, 1002e) however pointing skyward instead of along-ground, and with either horizontal or right- or left-circularly polarized radiation patterns, and which nominally radiate upwards in a cone shape subtending some angle (1050), though any other shape is possible. The shape of the upward radiation pattern may be electronically steered or controlled. It may also be isolated further from ground radiation patterns by passive shield or screens (1060), further minimizing the effect of side-lobes from the ground-oriented radiation patterns on aerial transceivers, and vice versa.

The radiated area in which sufficient link margin is available for successful communications between the fixed location transceivers and the UAVs or RPVs (1001c, 1002c) is created by designing both the shape of the radiation pattern in conjunction with the power of each transceiver (both those on the UAV/RPV as well as that associated with the fixed location transceiver) in any number of manners well known by those practiced in the art, including commercially available software. When further considering the distance to other fixed location transceivers, an overlap region can be easily designed which produces an elevated layer (1021) in which an aerial vehicle can be assured of having both no black-out regions (1080), as well as sufficient link margin to insure reliable communications.

In addition, in one embodiment, a second (or third or fourth, and so on) set of cones of skyward radiating patterns may be built, with different subtended angles (1051) and different polarizations and/or powers for each transceiver pair, such that another layer (1031) of continuous coverage over some larger region is created at a different elevation. Although an aerial vehicle could enter airspace where it was operating below a contiguous communications layer and still obtain a signal from a specific fixed antenna, for example at point (1070), if it continued at the same elevation and arrived at point (1071), it would be actually outside of the higher altitude signal cones (1001d, 1002d), but beyond sufficient link margin to obtain reliable communications links via lower altitude signal cones (1001c, 1002c), and thus would likely lose communications. According to some preferred embodiments, sets of skyward cones may have polarizations different polarizations of other sets of skyward cones. The polarization also may be configured to correspond with polarizations of receiving and transmitting transceivers of communicating components (e.g., UAVs and RPVs). For example, one set of cones may be configured with right-hand circular polarization and another set of skyward cones may be configured with left-hand circular polarization. These configurations may provide increased isolation of the signals, in addition to any isolation provided by the frequency diversity (e.g., between cone sets). For example, according to some preferred embodiments, a first set of skyward signals may be polarized in a first polarization pattern and a second set of skyward signals may be polarized in a second polarization pattern. According to some preferred embodiments, the polarization patterns may be circular patterns. According to an exemplary embodiment, one set of skyward signals may be polarized in a right-hand circular polarization pattern and another set, such as a second set, of skyward signals may be polarized in a left-hand circular polarization pattern. Each set of skyward signals may be configured to faun a shape, such as, for example, a cone. According to an exemplary embodiment, the system may be configured to communicate where a first set of skyward signals forms a first skyward cone, and where a second set of skyward signals forms a second skyward cone. The first and second sets of signals preferably have different polarizations to further isolate the first set from other signal sets. For example, the first skyward cone may be polarized in a right-hand circular polarization pattern, and the second skyward cone may be polarized in a left-hand circular polarization pattern. Skyward pointing antennas may be used to radiate sets of signals of differing frequencies, and where each signal set has a different frequency. The skyward radiation patterns preferably are electronically created. According to preferred embodiments, the unmanned aerial vehicle (UAV) or remote piloted vehicle (RPV) may be configured with a transceiver that communicates through a polarized signal pattern similar to the polarized signal pattern of communications from the network and radiated from the skyward pointing antennas having the communicating frequency. For example, the skyward pointing radiation pattern may be electronically steered to follow a specific unmanned aerial vehicle (UAV) or remote piloted vehicle (RPV). In addition, according to an exemplary embodiment, one skyward signal cone may be an upper layer and another skyward cone may be a lower layer. Each of the layers preferably has a different polarization pattern. For example, the first or upper skyward layer may have a left-hand circular polarization pattern of radiation and the second or lower skyward layer may have a right-hand circular polarization pattern of radiation. The radiation energy for each layer is configured to have different frequencies for each layer or cone. In this exemplary embodiment, the RPV communication takes place within the first or upper layer (e.g., the first skyward cone), and the UAV communication takes place within the second or lower layer (e.g., second skyward cone), as described in connection with the UAV communication in FIG. 10. Fixed location transceivers, such as, for example, those 3001, 3002, 3003, 3004 (FIG. 11) deliver the RF radiation (e.g., radiation pattern) via one or more associated antennas, e.g., antennas 5001, 5002, 5003, 5004. The UAV in this example has a transceiver configured for transmitting and receiving, and more particularly, the UAV transceiver is configured to transmit and receive signals in a right-hand circular polarization pattern. The RPV, according to this example, has a transceiver configured for transmitting and receiving, and more particularly, the RPV transceiver is configured to transmit and receive signals in a left-hand circular polarization pattern. The cellular network base station preferably has a transceiver that is configured to transmit and receive signals in a polarization pattern (and frequently) that matches the pattern of the communicating transceiver (such as a transceiver of a UAV or RPV), which, according to some preferred embodiments, may be a right-hand circular polarization pattern or a left-hand circular polarization pattern.

By electronically controlling the beam angle (1050, 1051) and power which the fixed location transceivers (1001, 1002) deliver into the skyward pointing antenna systems, in any of a number of manners well known to those practiced in the art, the altitude and thickness of the continuous communications layers can be adjusted. This adjustment capability enables the continuous communication layer to follow either a certain elevation above ground level or a certain elevation above mean sea level. Aircraft altitudes are often controlled by measurement of altitude via barometric pressure and UAVs and RPVs may be directed by local air traffic controllers or regulations in a similar manner. The layer can be adjusted in elevation above ground level or mean sea level as often as desired, even minute-by-minute, according to any parameter necessary.

By way of example, the lower altitude continuous communications layer (1021) might be controlled to range from 500 feet above ground level to 2000 feet above ground level. The higher altitude continuous communications layer (1031) might be controlled to range from 20,000 feet above mean sea level to 25,000 feet above mean sea level.

When a UAV as indicated (1051) is operating in a lower continuous communications layer travels through the cone of coverage directed at a higher communications layer, the receiver in the UAV (1051) is many times closer to the transmitter (1002) than the high altitude RPV (1050). However, in most commercial application situations, the smaller UAV (1051) would have a lower gain receiving antenna compared to the larger RPV (1050) and thus the received signal power in the UAV (1051) from the radiated power in the higher altitude directed cone (1002*d*) can be less than that received by the UAV (1051) from the radiated power in the lower altitude directed cone (1002*c*). Put another way, the available gain from a ground-pointing antenna which is able to be deployed in the RPV (1050) can more than make up for any signal loss from its extra distance, and therefore it is possible in many configurations for the higher altitude directed beam (1002*d*) emanating from the ground antenna (1002*f*) to be considerably lower field strength at UAV (1051) than the field strength from the lower altitude directed beam (1002*c*) at UAV (1051).

While the frequency diversity indicated in FIG. 10 only makes use of 4 frequency groups (fA, fB, fC, fD), it is easily recognized by those practiced in the art of cellular system design that many more arrangements are possible without departing from the scope of the invention.

It can also be recognized by those practiced in the art that the link margins between the fixed ground transceivers (1001, 1002) and UAVs (1051) and RPVS (1050) operating in communications layers (1021) and (1031) respectively can be more tightly constrained than the link margins between the fixed ground transceivers and typical personal mobile devices and smart phones transceiving via along-ground links (1001*a*, 1001*b*, 1002*a*, 1002*b*). This is because unlike a mobile phone which may be in a drawer, in a person's pocket or deep inside a building in a big city with multi-path, fading and difficult signal attenuation conditions which must be accommodated, the attenuation of the UAV-to-Fixed-Ground-Transceiver link or the RPV-to-Fixed-Ground-Transceiver link would in most situations be dominated simply by path loss.

In addition to the creation of one or more continuous communication layers with the attendant addition of frequency diversity considerations in the skyward beams, customary cellular system protocols, such as those employed in GSM, 3G, 4G or LTE signaling and link management protocols can include special identification of signals directed to or coming from UAVs or RPVs. Such an adjustment to the protocols can be as simple as a specialized IMEI class of numbers. By quickly enabling the identification of the class of subscriber on the mobile network as UAV or RPV versus a mobile device primarily intended for along-ground use (such as a personal cell phone or smartphone), the system can eliminate connecting to (for example) a person who accidentally left their personal cell phone on while taking a commercial flight.

According to a preferred embodiment, the system is configured for transmitting and exchanging RF communications with UAVs, where the system is provided with two distinct frequency bands, which preferably are RF communication bands. One of the communications bands is utilized for optional use to support datagrams, such as, for example, between a UAV payload and a computer or controller, while a second RF communications band is provided and is dedicated to command and control and navigation datagrams transception between the UAV and a host controller or control network.

According to preferred embodiments, a layer, such as the layer that is configured to comprise a second aerial zone (e.g., by way of example, the second layer 1021 in FIG. 10 servicing UAV communications), preferably is configured to comprise a first sub-system and second sub-system of the UAV communication system. The first sub-system preferably is dedicated only to servicing the needs of the UAV for RF transceiving of application datagrams with the payload of the UAV, such as, for example, without limitation, a digital video camera that may be carried by the UAV. In addition to the first sub-system, a second sub-system is provided which is isolated from the first sub-system. The second sub-system is configured to handle more critical command, control and navigation functions with respect to the UAV. According to preferred embodiments, the system is configured so that the second sub-system acts as the RF transceiving channel for datagrams between a controller or controlling computer network hosting a UAV air traffic control system. The first subsystem and second subsystem preferably operate using different frequencies or channels, but provide communications at the UAV communication elevated region (e.g., such as the lower altitude continuous communications layer 1021, FIG. 10).

The second sub-system preferably is configured as an RF communications system with a plurality of upwardly projecting cellular-type radiation zones providing the coverage. The cellular zones preferably are divided into sub-channels, providing a plurality of sub-channels as part of the second sub-system. With regard to the second RF communications sub-system, for example, a large region may be covered suitable to enable communications with many UAVs by creating a skyward projected cell system, and dividing its frequency range into sub-channels in order to re-use frequencies across a larger geographic region, similar to the way a traditional cellular based system works. For example, the range of 5000 to 5091 MHz may be divided into three sub-bands, which may be 5000 to 5030 MHz, 5030 to 5060 MHz and 5060 to 5090 MHz. Preferably, according to preferred implementations of the system, the various sub-bands, such as, for example, the three sub-bands depicted in the exemplary implementation of the system, may be re-used in a re-use scheme.

Figure 11:
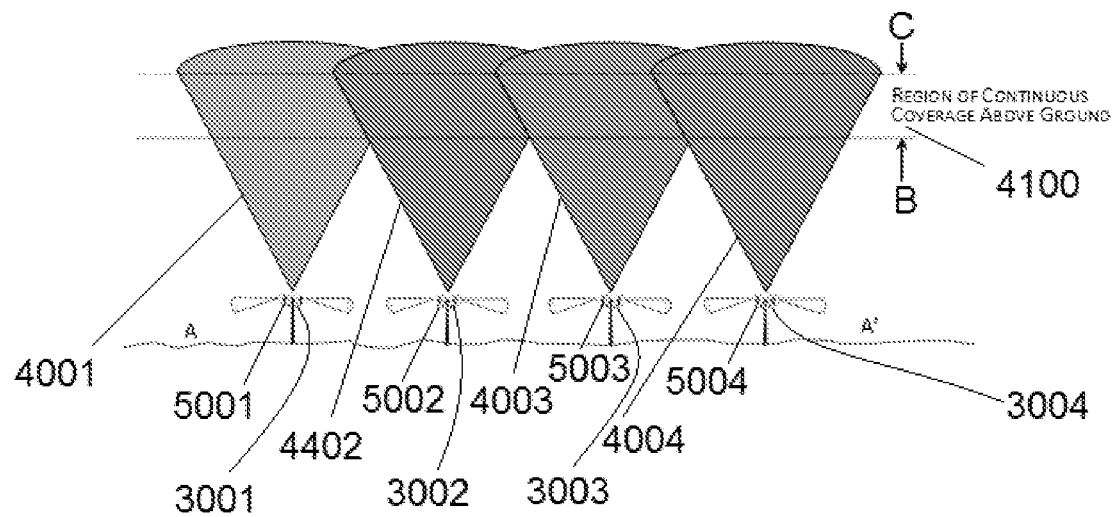
FIG. 11 is an illustration of an exemplary embodiment implementing a system for employing separate frequency bands for communications with a UAV, the depiction illustrating an arrangement of cones of skyward radiation comprising the regions along the line A-A' of FIG. 12.
Figure 12:
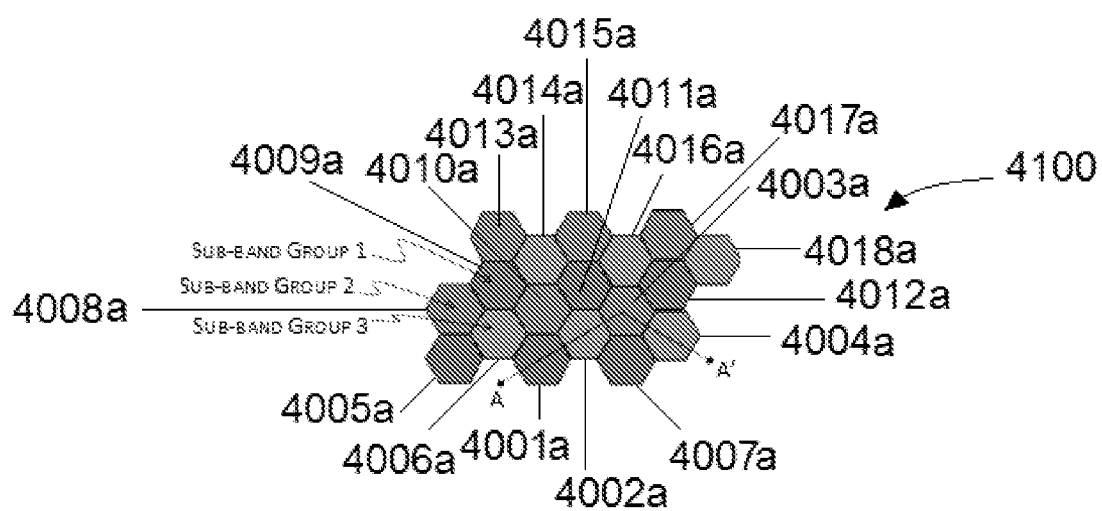
FIG. 12 is a representative arrangement of the sub-band radiation of the second sub-system, and presents a top plan view of sub-band physical distribution and use of a command and control band.

An exemplary depiction of a system according to the invention is illustrated in FIGS. 11 and 12. According to FIG. 11, there is illustrated, without limitation by way of example, an arrangement depicting a plurality of cones of skyward radiation. A first cone of radiation 4001 is depicted and represents sub-band Group 1, which has a sub-band that preferably lies within the range of the second sub-system. A second cone of radiation 4002 is depicted and represents sub-band Group 2, which has a sub-band that preferably lies within the range of the second sub-system. A third cone of radiation 4003 is depicted and represents sub-band Group 3, which has a sub-band that preferably lies within the range of the second sub-system. The fourth cone of radiation 4004 is depicted, and is shown representing sub-band Group 3, which is the sub-band that is depicted in conjunction with the radiation cone 4003. The sub-region groups illustrated by the radiation cones 4001, 4002, 4003, 4004 in FIG. 11 preferably are propagated by respective skyward pointing antennas (5001, 5002, 5003, 5004) associated with a respective plurality of transceivers 3001, 3002, 3003, 3004 on network towers. The angle of a radiation cone projected by an antenna may be adjusted, which, for example, may be done electronically or mechanically. For example, according to the depiction in FIG. 11, the radiation cones 4001, 4002, 4003, 4004 in projected by the respectively associated skyward pointing antennas 5001, 5002, 5003, 5004, may be adjusted by electronically or mechanically manipulating the antenna. For example, fixed location transceivers 3001, 3002, 3003, 3004 (similar to those 1001, 1002 depicted in connection with the embodiments of FIG. 10) are powered to deliver RF signals to the skyward pointing antennas. The beam angle of the radiation cones, such as, those 4001, 4002, 4003 and 4004 represented in FIG. 11, may be electronically controlled. The control of the beam angle may be accomplished by any of a number of manners well known to those practiced in the art, the altitude and thickness of the continuous communications layers, such as the command and control and navigation communication layer 4100 of FIG. 12, may be adjusted. Accordingly, as discussed in connection with the layers 1021, 1031 shown and described in connection with FIG. 10, the adjustment capability enables the continuous communication layer 4100 to follow either a certain elevation above ground level or a certain elevation above mean sea level. For example, the layer 4100 depicted in FIG. 11 preferably may serve the second sub-system of the UAV communication system, and may be provided at the same level as layer 1021 (FIG. 10). The layer 4100 may comprise the layer 1021, as the second sub-system of the UAV communication system, and preferably comprises the layer 1021 with a first sub-system layer (for handling other UAV communications). For example, according to a preferred implementation of the system, the layer 1021 may comprise the first frequency range over which the command and control and navigation communications are carried out (represented by the region layer 4100 in FIGS. 11 and 12) and may comprise a second frequency range (or frequency) over which other communications are exchanged, such as, for example, datagrams between a UAV payload (e.g., remote sensing operations) and a computer or controller. Alternatively, the layer, such as the regional layer 4100 depicted in FIG. 12, may be adjusted in elevation above ground level or mean sea level as often as desired, even minute-by-minute, according to any parameter necessary. This may be done along with or separately from the UAV payload datagram layer or its constituent frequency or frequencies.

Embodiments of the system may be implemented separately, with transceiving components and/or antennas provided on separate towers, such as, for example, a dedicated tower for this purpose only. Alternatively, according to some other embodiments, the system may be implemented by mounting hardware components on an existing cell phone tower. According to other embodiments, the system may be configured where some portions are provided on dedicated towers and other portions may be provided on existing towers. For example, an array of existing cell phone towers may be used to provide signal propagation to generate the communications signals over the sub-band Group band range (e.g., such as the sub-band Groups 1, 2 and 3 depicted in FIGS. 11 and 12).

According to preferred embodiments, the system is configured to enhance the reliability. Some preferred embodiments may employ separate redundant back-haul between a wireless equipment datagram transceiver point and a management component, such as, for example, a central computer handling the air traffic control datagrams for a region. The redundant back-haul preferably may be configured to provide redundant access points across the network. For example, the transceivers that are provided in towers to handle communications between the UAV and the command and control computer that is on the network and, which, for example, may be connected to communicate through a base transceiver, preferably are configured to provide redundancy between the wireless transceiver and the command computer.

As illustrated, the system preferably provides a plurality of radiation signal cones that are generated in the skyward direction, and which preferably are arranged to form a physically distributed region of communications 4100. The region 4100 is a depiction showing a representation of an exemplary depiction to show the regions represented by the arranged radiation zones comprised of sub-band groups. The second sub-system preferably forms the sub-band groups. As depicted in FIG. 12, the top view shows the radiation cones 4001,4003,4002,4004, arranged adjacently, and further illustrates additional radiation cones. The radiation cones in FIG. 12 represent an elevated region or zone 4001*a*, 4002*a*, 4003*a*, 4004*a*, respectively, of each radiation cone 4001, 4002, 4003, 4004 shown in FIG. 11. The radiation cones 4001, 4002, 4003, 4004 of FIG. 11 are cones forming the elevated regions 4001*a*, 4002*a*, 4003*a*, 4004*a* in FIG. 12, and comprise the regions along the line A-A' of FIG. 12, which is shown passing through the center of each cone segment. The radiation cones preferably are adjacently arranged to form the respective elevated regions of the cones, as illustrated in the depiction of FIG. 12. In addition to the radiation cones 4001, 4002, 4003, 4004 depicted in FIG. 11, further radiation zones or regions are provided, including a first plurality of cones of sub-band Group 1, a second plurality of cone of sub-band Group 2, and a third plurality of cones of sub-band Group 3. According to a preferred embodiment, each radiation cone preferably is generated from a respective RF generation source (e.g., a transceiver), and propagated by one or more respectively associated antennas, and each radiation cone is provided in an adjacent arrangement to effect continuous coverage of the region or zone.

As illustrated in the depiction of FIG. 12, a representative arrangement of the sub-bands of the second sub-system is illustrated. The sub-bands of each Group (which in the exemplary illustration are Groups 1, 2 and 3), preferably lie within the range of the second sub-system. Three sub-band Groups are illustrated, similar to the sub-band Groups depicted in FIG. 11, including, as represented in FIG. 12, band zones 4005*a*, 4006*a*, 4007*a*, 4008*a*, 4009*a*, 4010*a*, 4011*a*, 4012*a*, 4013*a*, 4014*a*, 4015*a*, 4016*a*, 4017*a*, 4018*a*. The band zones in FIG. 12 preferably are subtended portions of respective radiation cones (similar to those cones 4001, 4002, 4003, 4004 of FIG. 11). In the depiction of FIG. 12, sub-band Group 1 is shown comprised of a first group of representative regions, namely, the representative cones 4001*a*, 4005*a*, 4007*a*, 4009*a*, 4011*a*, and 4012*a*. Sub-band Group 2 is depicted comprised of another group of representative regions, namely, the representative cones 4003*a*, 4008*a*, 4010*a*, 4013*a*, 4015*a*, and 4017*a*. Sub-band Group 3 is depicted comprised of another group of representative cones 4002*a*, 4004*a*, 4006*a*, 4014*a*, 4016*a*, and 4018*a*. The physically distributed region of communications 4100 is illustrated as an elevated region forming a region of continuous coverage above ground. The elevated region 4100 of FIG. 12 is shown represented by the region 4100 of FIG. 11, between arrows B and C, of the radiation cones depicted. Additional radiation bands are broadcast to provide the additional sub-band group constituents (e.g., 4005*a* through 4018*a*) depicted in FIG. 12 (although FIG. 11 depicts four cones 4001, 4002, 4003, 4004).

The elevated region 4100 preferably represents the command and control band for UAV communications. Preferably, the system is configured to handle UAV command and control operations including navigation functions. In the illustrations depicted in FIGS. 11 and 12, the elevated region 4100 comprises the second-sub system. In accordance with a preferred implementation of the system, UAV control transmissions are handled through the elevated region 4100. A remotely situated computer or control component may issue commands to the UAV through transmissions, which preferably take place over the RF sub-system. For example, datagrams between a controller or controlling computer network hosting a UAV air traffic control system may be handled through the second subsystem, as represented by the region 4100, which preferably comprises an RF transceiving channel.

According to preferred embodiments, the sub-band groups preferably are divided among a continuous band range of bandwidth. For example, the second RF communications sub-system, represented by the region 4100 in FIGS. 11 and 12, provides a large region that may be covered which is suitable to enable communications with many UAVs. The skyward projected cell system, in the exemplary depiction, is illustrated dividing its frequency range into a plurality of sub-channels (represented by sub-band Groups 1, 2 and 3). For example, the elevated region 4100 may be formed from a plurality of sub-bands. The sub-bands preferably are band width regions within the elevated region 4100. As illustrated, three sub-band groups are shown. According to one example, the range of 5000 to 5091 MHz may be divided into 3 sub-bands of 5000 to 5030 MHz, 5030 to 5060 MHz and 5060 to 5090 MHz, where the various sub-bands are re-used in a re-use scheme. FIGS. 11 and 12 depict an exemplary implementation, where the cones of skyward radiation represent three separate sub-bands of radiation, where the sub-bands comprise a portion of a band range, which preferably is a continuous portion of a continuous band range, divided by the number of sub-bands. According to preferred sub-bands comprise adjacent portions of a bandwidth range.

Alternate bandwidth arrangements may be implemented for the second layer that is configured to comprise a second aerial zone. For example, the second RF communications band may be configured having a frequency range of about 4200 to 4400 MHz. This range may be subdivided, for example, into three sub-band Groups, for example, to be 200/3 each or about 66.67 MHz zones, where the first sub-band group is from about 4200 to 4267 MHz, the second sub-band Group from about 4268 to 4333 MHz, and the third sub-band Group of about 4334 to 4400 MHz. According to another exemplary embodiment, the second RF communications band may be configured having a frequency range of about 5000 to 5250 MHz, and may be divided into a plurality of sub-band Groups.

According to preferred embodiments, the re-use scheme may be configured as a spatial frequency re-use scheme, like that of terrestrial cell systems, however, it is projected up into the sky, as opposed to projected along ground. The re-use scheme preferably is arranged to increase the coverage and capacity of the communications that may be handled. In the cell arrangements, the adjacent cells are configured to use different frequencies. Cells that are suitably distant from each other may operate on the same operating frequency (where the cellular transceiver or user equipment does not transmit with an overpowering range). The cells are separated so as to minimize or eliminate the tendency for co-channel interference. In addition, according to preferred embodiments, the UAV preferably is configured with a transceiver that is suitably powered to communicate within a cell range, without generating an interfering amount of overage into other neighboring cells that use/re-use the same frequency as the cell through which the UAV is communicating.

Frequency reuse may be determined through consideration of the reuse distance and the reuse factor, which may be expressed in equation (1), as follows:

$$D = R\sqrt{3N} \quad (1)$$

where D is the reuse distance, R is the cell radius, and N is the number of cells per cluster. For example, cells may vary in radius from about 1 to 30 kilometers (about 0.62 to 18.64 mi). Frequency reuse may be designated by a factor, and represented by 1/K, where K is the number of cells which cannot use the same frequencies for transmission. In the illustration depicted in FIG. 12, the reuse factor for the second sub-system of the second aerial zone, is 1/3. According to some alternate embodiments, the frequency reuse factor may be 1/4, 1/7, 1/9 and/or 1/12.

According to some implementations where a code division multiple access (CDMA)-based system is used, a wider frequency band may be used to achieve the same rate of transmission as FDMA. A reuse factor of 1, for example using a reuse pattern of 1/1 may be employed where adjacent base station sites may use the same frequencies. However, the base stations and users are separated by codes rather than frequencies, and the entire cell bandwidth also may be available to each sector individually.

According to preferred embodiments, the sub-region groups illustrated by the radiation cones in FIGS. 11 and 12, preferably are propagated by skyward pointing antennas (5001, 5002, 5003, 5004, FIG. 11). According to preferred embodiments, these skyward signals propagated by the skyward pointing antennas may be polarized, and preferably, horizontally or circularly polarized. As previously discussed in connection with the first and second aerial coverages, illustrated in FIG. 10, two sets of signals may be radiated skyward of differing sets of frequencies, where the angles subtended by the radiation pattern differ in order to effectuate continuous communications coverage for differing elevation bands above the antenna. For example, considering an example where a UAV is operating at the illustrated lower level (see FIG. 10), according to preferred embodiments, the UAV command and control functions may be transmitted using the sub-band group arrangement depicted in FIGS. 11 and 12. The sub-band Groups preferably represent propagated RF signals at a particular or designated frequency range, of which some examples are provided (e.g., 5000 to 5091 MHz, and 4200 to 4400 MHz). According to some embodiments, the skyward signal propagated by the skyward pointing antennas, such as, for example, the antennae propagating the sub-band Group signals of Groups 1, 2 and 3, depicted in FIGS. 11 and 12, may be polarized in accordance with preferred polarization. For example, the radiation propagation from a skyward antenna may be configured to direct radiation in a pattern, such as, for example, in a shape, like a cone. As illustrated in accordance with the exemplary depiction, signal isolation may be implemented in connection with the sub-band groups to enhance the quality of the communications and reduce or eliminate potential adverse interactions, in particular, with regard to the command and control datagrams. The frequency diversity of the signals represented by the cones and sub-band Groups in FIGS. 11 and 12 may be further isolated by implementing polarization patterns. According to a preferred embodiment, polarization may include right-hand circular polarization and left-hand circular polarization. For example, one skyward cone (e.g., a first sub-band group) may have right-hand circular polarization of the propagated signals, while another skyward cone (e.g., another sub-band group, which may be an adjacent sub-band) may have left-hand circular polarization of the propagated signals. According to some embodiments, the system, method and devices may further provide polarization patterns for UAV and RPV transmitting and receiving, as well as the base station. For example, corresponding polarization patterns may be implemented for transmission and reception between communicating components, such as transceivers. The implementation of polarization, such as, for example, where right circular and left circular polarization is employed, may be configured as part of a spatial frequency re-use scheme. One or more of the sub-group bands may be polarized. For example, as depicted in FIG. 12, and using the depiction to illustrate an exemplary embodiment, according to some embodiments, the sub-band Groups may be propagated so that one or more of the groups are right circular polarized and one or more others of the groups are left circular polarized.

Embodiments of the system may be configured to implement forward error correction (FEC) in the construction of datagrams. For example, communications and transmissions between the UAV and a command control component or computer may be generated by encoding the transmission message in one or more error-correcting formats. According to some embodiments, forward error correction is implemented by encoding the transmission in a redundant manner, which preferably may be carried out using error-correcting code (EEC). According to this embodiment, the transmission code redundancy allows the receiver, such as the UAV or the control computer, to detect a limited number of errors that may occur anywhere in the message transmission. A benefit of the FEC implementations in the communications between the UAV and another component, such as a command and/or control computer is that the detected errors preferably may be corrected without the need for the message to be retransmitted. For example, implementation of FEC allows the receiver of the encoded message to have the capability to correct errors without requiring additional bandwidth (such as a reverse channel) to request retransmission, thereby conserving time and bandwidth usage.

According to some embodiments, the UAV and command or control computer may provide alternate or additional error correcting features. According to some embodiments, the transmissions between the UAV and the command or control computer may be configured to generate communication messages with convolutional error correction codes in the construction of datagrams. For example, according to some embodiments, the convolutional error-correcting code implements a sliding application of a boolean polynomial function of a datastream that generates parity symbols, and represents the so called 'convolution' of the encoder over the data. A time-invariant trellis decoding scheme may be used to allow the convolutional codes to be decoded. The sliding nature of the convolutional codes facilitates trellis decoding using a time-invariant trellis.

Embodiments of the system may be configured to implement forward error correction (FEC) in the construction of datagrams which are implemented as turbo codes. For example, communications and transmissions between the UAV and a command control component or computer may be generated by encoding the transmission message in accordance with forward error correction using turbo codes in the construction of datagrams. The UAV and command control computer may be configured with suitable hardware components containing instructions to implement processing and generate turbo codes. For example, the UAV (and preferably the command and control computer) may be provided with an encoder arrangement of two identical RSC coders, Coder1 and Coder2, which preferably are connected using a parallel concatenation configuration, where an interleaver carries out the permutation of the payload data. The arrangement of RSC coders encodes the message and preferably the payload data, to provide turbo code error correction for communications transmitted from the UAV and/or command and control computer. Similarly, the UAV and command or control computer preferably is provided with a decoder, which may be constructed similar to the encoder, but with the decoders in a serial arrangement. Where the UAV and command control computer each has an encoder and decoder, turbo code error correction may be carried out for transmissions sent and received therebetween. The turbo codes may be configured in different implementations, using different component encoders, input/output ratios, interleavers, and puncturing patterns. According to an exemplary embodiment, FEC may be implemented using turbo codes, where an encoder sends three sub-blocks of bits. In an exemplary implementation, the first sub-block may be the m-bit block of payload data (which contains the importance of the message or transmission from the UAV/command or control computer, without metadata or headers). A second sub-block may be n/2 parity bits for the payload data, and may be generated using a recursive systematic convolutional code (RSC code), while a third sub-block, which also may be generated using RSC code, is n/2 parity bits for a known permutation of the payload data. The encoded message payload data therefore is communicated from the UAV to the command control computer (or vice versa), which may comprise two redundant (but different) sub-blocks of parity bits along with the payload data. According to an exemplary embodiment, the block preferably may have m+n bits of data with a code rate of m/(m+n). The transmitted encoded message (or message component) is decoded with a decoder configured in the receiving one of the UAV and/or the command and control computer. The decoder decodes the encoded message (or datagram). For example, the decoder may decode an m+n bit block of data by generating a block of likelihood measures (with one likelihood measure for each bit in the data stream). The decoder may be configured with two convolutional decoders, each of which generates a hypothesis with derived likelihoods for the pattern of m bits in the payload sub-block. The system is configured to compare hypothesis bit-patterns to determine whether they differ, and, if they differ, then the decoders exchange their respective derived likelihoods for each bit in the hypotheses. Each decoder generates a new hypothesis (D1Hn and D2Hn) by incorporating the derived likelihood estimates from the other decoder. The comparison of the newly generated hypotheses (D1Hn and D2Hn) are compared, and the process repeated, with further hypotheses (D1Hn+1 and D2Hn+1) being generated until both decoders arrive at the same hypothesis (D1Hx=D2Hx) for the m–bit pattern of the payload data.

These and other advantages may be realized with the present invention. While the invention has been described with reference to specific embodiments, the description is illustrative and is not to be construed as limiting the scope of the invention. Although the cells are depicted as being hexagonal zones, they may be configured to have other shapes, such as, for example, square, circular, or other rectangular shape. Also, the radiation shape or pattern according to some preferred embodiments is described as a cone, but it may be configured to have other shapes. For example, in FIG. 12 the cells are depicted as hexagonal zones, but they may be configured to have other shapes, such as, for example, square, circular, or other rectangular or other geometric perimeters. In addition, the sub-band Groups are depicted in the exemplary embodiments as being divided into three groups, but a frequency range may be divided into other numbers of sub-band groups. Although referred to as second sub-system, embodiments may be implemented with a dedicated sub-system that handles the communication command and control center and navigation datagrams, depicted and described herein. Further, while FIG. 10 illustrates network towers 1001, 1002, and FIG. 11 illustrates network towers 1001e, 1002e, a plurality of network towers may be utilized in conjunction with the system, methods and components shown and described herein. For example, the skyward pointing antennas may be connected to existing network equipment and/or supported by existing network towers. According to some implementations, the network equipment may be configured to treat the skyward pointing antenna or antennas as an additional cell zone. According to some embodiments, the skyward antennas may be configured to operate with an additional set of network equipment or component thereof. Various modifications and changes may occur to those skilled in the art without departing from the spirit and scope of the invention described herein and as defined by the appended claims.

What is claimed is:

1. A system for RF communications with UAVs which includes two distinct frequency bands, a first frequency band for optional use to support datagrams between a UAV payload and a computer or controller and a second RF communications band dedicated to command and control and navigation datagrams transception between the UAV and a host controller or control network,
    wherein the RF communications with UAVs are carried out in a regional layer that may be adjusted in elevation above ground level or mean sea level as often as desired, even minute-by-minute; and
    wherein said adjustment in elevation above ground level may be done along with or separately from the UAV payload datagram layer or its constituent frequency or frequencies.

2. The system of claim 1, wherein the second RF communications band is in the frequency range of 4200 to 4400 MHz.

3. The system of claim 2, wherein said second RF communications band is divided into a plurality of sub-bands.

4. The system of claim 3, wherein said second RF communications band is divided into three sub-band groups, each sub-band group consisting of a bandwidth segment having a frequency range within the range of 4200 to 4400 MHz, and wherein each sub-band range of a sub-band group is different than the sub-band range of another group.

5. The system of claim 3, wherein said sub-band groups are arranged in a re-use configuration.

6. The system of claim 1, wherein the second RF communications band is in the frequency range of 5000 to 5250 MHz.

7. The system of claim 6, wherein said second RF communications band is divided into a plurality of sub-bands.

8. The system of claim 7, wherein said second RF communications band is divided into three sub-band groups, each sub-band group consisting of a bandwidth segment having a frequency range within the range of 5000 to 5250 MHz, and wherein each sub-band range of a sub-band group is different than the sub-band range of another group.

9. The system of claim 6, wherein said sub-band groups are arranged in a re-use configuration.

10. The system of claim 2, wherein said second RF communications band is arranged in a spatial frequency re-use scheme, like that of terrestrial cell systems, wherein said RF communications band comprises radiation projected up into the sky, as opposed to projected along ground.

11. The system of claim 6, wherein said second RF communications band is arranged in a spatial frequency re-use scheme, like that of terrestrial cell systems, wherein said RF communications band comprises radiation projected up into the sky, as opposed to projected along ground.

12. The system of claim 2, wherein command and control and navigation datagrams transception between the UAV and a host controller or control network is carried out using forward error correction in the construction of datagrams.

13. The system of claim 6, wherein command and control and navigation datagrams transception between the UAV and a host controller or control network is carried out using forward error correction in the construction of datagrams.

14. The system of claim 12, wherein said forward error correction comprises convolutional error correction codes in the construction of datagrams.

15. The system of claim 13, wherein said forward error correction comprises convolutional error correction codes in the construction of datagrams.

16. The system of claim 2, wherein command and control and navigation datagrams transception between the UAV and a host controller or control network is carried out using turbo codes in the construction of datagrams.

17. The system of claim 6, wherein command and control and navigation datagrams transception between the UAV and a host controller or control network is carried out using turbo codes in the construction of datagrams.

18. The system of claim 2, wherein right circular and left circular polarization are employed as part of a spatial frequency re-use scheme.

19. The system of claim 6, wherein right circular and left circular polarization are employed as part of a spatial frequency re-use scheme.

20. The system of claim 2, wherein said system includes a plurality of wireless transceivers and at least one central computer for handling air traffic control datagrams for a region, and wherein said system is configured with separate redundant back-haul between a wireless equipment datagram transceiver point and the central computer handling the air traffic control datagrams for the region.

21. The system of claim 6, wherein said system includes a plurality of wireless transceivers and at least one central computer for handling air traffic control datagrams for a region, and wherein said system is configured with separate redundant back-haul between a wireless equipment datagram transceiver point and the central computer handling the air traffic control datagrams for the region.

22. The system of claim 2, wherein said system comprises an antenna associated with a transceiver, and wherein second RF communications band comprises radiation propagated through said antenna to form a radiation cone, and wherein the angle of the radiation cone projected by the antenna can be adjusted electronically.

23. The system of claim 6, wherein said system comprises an antenna associated with a transceiver, and wherein second RF communications band comprises radiation propagated through said antenna to form a radiation cone, and wherein the angle of the radiation cone projected by the antenna can be adjusted electronically.

24. The system of claim 2, wherein said system comprises an antenna associated with a transceiver, and wherein second RF communications band comprises radiation propagated through said antenna to form a radiation cone, and wherein the angle of the radiation cone projected by the antenna can be adjusted mechanically.

25. The system of claim 6, wherein said system comprises an antenna associated with a transceiver, and wherein second RF communications band comprises radiation propagated through said antenna to form a radiation cone, and wherein the angle of the radiation cone projected by the antenna can be adjusted mechanically.

26. The system of claim 1, wherein said second RF communications band dedicated to command and control and navigation datagrams transception between the UAV and a host controller or control network is propagated through equipment mounted on an existing cell phone tower.

27. The system of claim 1, wherein said second RF communications band dedicated to command and control and navigation datagrams transception between the UAV and a host controller or control network is propagated through equipment mounted on a cell phone tower dedicated to providing communications through said second RF communications band, wherein right circular and left circular polarization are employed as part of a spatial frequency re-use scheme, and wherein said system comprises at least one first skyward cone of propagated signals comprising a lower layer having at least one of right circular polarization or left circular polarization of the propagated signals of the first skyward cone, and wherein said system comprises at least one second skyward cone of propagated signals at a higher level layer that is higher than said lower layer, and wherein said second skyward cone has the other of said right circular polarization or left circular polarization of the propagated signals of the second skyward cone.

28. The system of claim 1, wherein said second RF communications band dedicated to command and control and navigation datagrams transception between the UAV and a host controller or control network is propagated through equipment mounted on a cell phone tower dedicated to providing communications through an RF subsystem.

* * * * *